United States Patent [19]

Maratta

[11] Patent Number: 5,224,283
[45] Date of Patent: Jul. 6, 1993

[54] LIGHTBOX

[76] Inventor: Charles J. Maratta, 291 Essex St., Beverly, Mass. 01915

[21] Appl. No.: 766,031

[22] Filed: Sep. 26, 1991

[51] Int. Cl.⁵ .............................................. G02B 27/02
[52] U.S. Cl. ........................................ 40/367; 40/361
[58] Field of Search ................. 40/361, 367, 366, 574, 40/450; 220/529, 500; 362/253

[56] References Cited

U.S. PATENT DOCUMENTS

| | | | |
|---|---|---|---|
| 2,233,938 | 3/1941 | Jones | 220/529 |
| 2,704,901 | 3/1955 | Hulse | 40/367 |
| 2,744,345 | 5/1956 | Janning | 40/366 |
| 3,217,436 | 11/1965 | Van Wormer, Jr. | 40/367 |
| 3,410,012 | 11/1968 | Kumei et al. | 40/366 |
| 3,442,039 | 5/1969 | Saizelet | 40/367 |
| 4,071,883 | 1/1978 | Dennis | 40/574 X |
| 4,375,132 | 3/1983 | Tradowsky | 40/361 |
| 4,587,753 | 5/1986 | Harper | 40/450 X |

FOREIGN PATENT DOCUMENTS 0495984 11/1938 United Kingdom ................. 40/367
0521337 5/1940 United Kingdom ................. 40/367

Primary Examiner—Kenneth J. Dorner
Assistant Examiner—Milton Nelson, Jr.

[57] ABSTRACT

A lightbox for cropping photographic negatives using masking cards comprising a pair of side walls spaced from each other and a back wall and a bottom wall disposed between the side walls, A front wall includes a light transparent viewing surface and slopes inwardly relative to the bottom wall at an angle of approximately 45°. A plurality of sets of posts are disposed on the front wall and each set is vertically and horizontally spaced from an adjacent set by a predetermined distance whereby the posts can receive a horizontally arranged array of masking cards to enable an operator to quickly crop negatives for printing. At least one row of compartments is disposed between the front and back walls, each of the compartments in a row being disposed above each of the sets of posts. The compartments and the front wall cooperating to form a housing for a light source.

15 Claims, 1 Drawing Sheet

LIGHTBOX

BACKGROUND OF THE INVENTION

The present invention relates to lightboxes and especially to lightboxes that are adapted to be used for cropping photographic negatives. The lightbox of the present invention is especially adapted to receive a plurality of masking cards which can be fed into automatically controlled photographic printers. Such masking cards are described in the U.S. Pat. No. 4,441,807 to Bartz. They include an image bearing negative receiving aperture, a array of indicia bearing boxes at predetermined locations on the card and registration holes which are disposed at fixed positions on the card relative to the aperture.

SUMMARY OF THE PRIOR ART

Lightboxes for viewing negatives are well known to the art. In the U.S. Pat. No. 4,152,852 to Brown patentee discloses a viewer in which a plurality of negatives can be disposed on racks to display them. More elaborate scanning devices are disclosed in the U.S. Pat. No. 4,185,406 to Schotsman and U.S. Pat. No. 2,943,410 to Haggar. Each of these patents disclose arrangements which can be used to display and hold large quantities of photographic negatives. The patent to Saizelet, U.S. Pat. No. 3,442,039, discloses a file cabinet for viewing negatives in which a number of compartments are covered by an illuminatable viewing surface. In the patents to Turner U.S. Pat. No. 1,413,507 and Morcheles U.S. Pat. No. 4,564,886 illuminated viewing devices for negatives are disclosed.

SUMMARY OF THE INVENTION

According to the present invention I have discovered a lightbox for use by photographers to crop and mount photographic negatives using masking cards which have registration holes and a photographic negative receivable aperture in which the registration holes are at predetermined spatial relationships relative to the aperture whereby the negative can be printed automatically in automatic printing equipment. The lightbox of the present invention also enables the operator to quickly evaluate the artistic composition of the negative in various cropping sizes whereby to produce an artistically valuable product. It also enables the operator to align the negative relative to the aperture so that the operator can provide for difficulties relating to alignment of the camera when a shot was taken.

The lightbox of the present invention includes a pair of side walls that are spaced from each other and a back wall and a bottom wall disposed between the side walls. A front wall is disposed between the side walls also. The front wall includes a frame which is attached to the back and side walls and serves as a frame for a light transmitting section, It slopes inwardly relative to the bottom wall, preferably at a 45° angle, to enable the operator to easily view the negatives that are being cropped and mounted. The front wall has a plurality of sets of posts disposed on it. The posts of each set are vertically spaced from each other by a predetermined distance and each set is spaced horizontally from an adjacent set by a predetermined distance whereby to receive masking cards having differently sized apertures thereby to provide the operator with an array of easily viewable choices of aperture sizes for cropping choices.

With the equipment of this invention the operator can quickly move a negative from one of the masking cards to another to judge if it can be artistically cropped in the aperture being evaluated. If unacceptable, the negative is easily moved to another card having a different sized aperture so that the best artistic portrayal of the subject matter can be attained. Illumination of the transparent surface can be accomplished by any conventional illumination devices such as fluorescent or incandescent lamps.

In the preferred embodiment a set of open ended compartments is disposed between the sloping front wall and the back wall of the lightbox. These compartments are sufficiently wide and deep to hold a quantity of the masking cards. As furnished to the operator, the top of the masking cards are color coded to indicate different apertures so that they can be easily stacked in individual compartments for quick use. In addition, the posts that are disposed on the front wall are sufficiently long to hold several masking cards so that the operator need not reach into the compartments each time that one of the cards is used.

DESCRIPTION OF THE PREFERRED EMBODIMENTS

Figure 1:
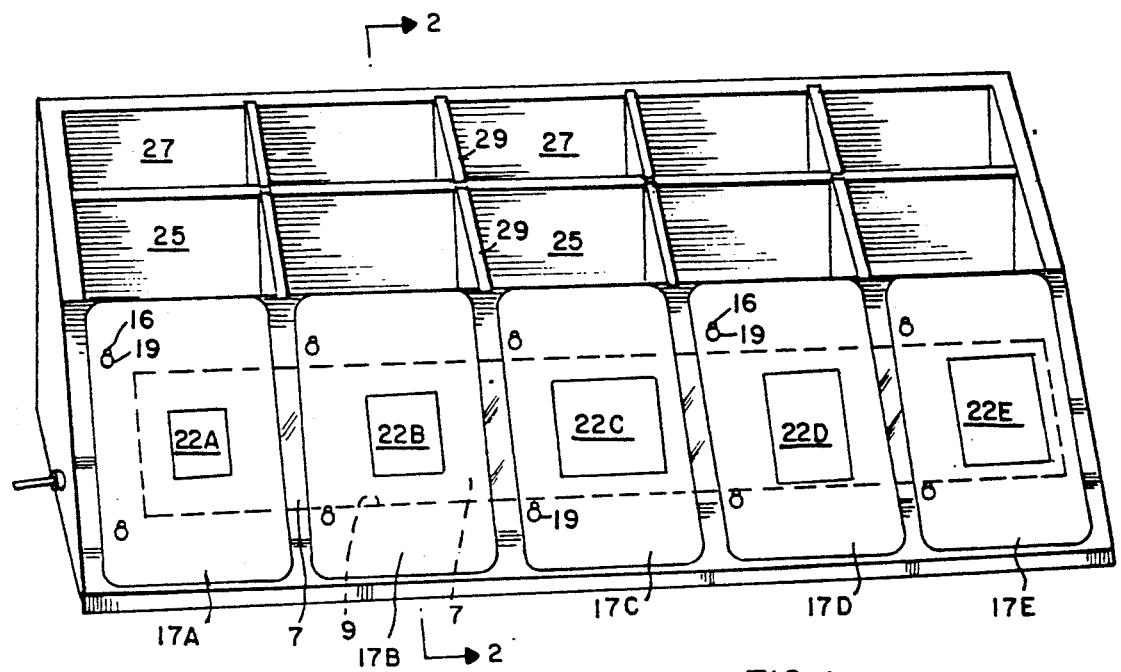
FIG. 1 is a perspective view of the lightbox of the present invention showing the disposition of masking cards on posts mounted on the front to enable the operator to crop and mount the photographic negatives.

Referring now to FIG. 1, the lightbox includes a back wall 1 and a bottom wall 3 with a front wall 5. The front wall 5 is disposed at approximately a 45° angle relative to bottom wall 3 to enable the operator to easily view photographic negatives which are to be cropped. In this embodiment, the front wall 5 of the lightbox is made of opaque material, preferably wood, molded plastic or metal, as is the rest of the device. A large, rectangular opening 9 is made in the front wall 5 to form a frame. A light transmitting viewing surface 7, preferably formed of transparent plastic material is disposed in the opening 9 and light from a source 11 passes through it to illuminate a photographic negative. The negative is placed over an aperture 22 formed in masking card 17. Masking card 17 is mounted on a set of posts 19 that are fitted on the front wall 5.

Bottom wall 3 is disposed upon a stand 21 that raises the lightbox from the surface upon which it is placed. The stand 21 allows for circulation of air through a port 23 formed therein.

A pair of rows of compartments 25 and 27 are disposed between the top of front wall 5 and back wall 1. The width of each of the compartments of a row is slightly greater than the width of the masking card 17. A reserve supply of color coded masking cards (different colors representing different apertures) can be placed in each of the compartments. In the embodiment shown, ten compartments formed in two rows are illustrated. The compartments are formed of vertical compartment walls 29 which are slidably disposed between a front compartment wall 30, a median compartment wall 31 and the back wall 1. Back wall 1 is taller than median wall 31 which in turn is taller than front compartment wall 30. Thus, the color coded tops of the masking cards can be easily seen by the operator to enable the selection of a card with an appropriate aperture from the lightbox. In the embodiment shown, air circulation is also provided by a port 24 formed in front compartment wall 30.

Figure 2:
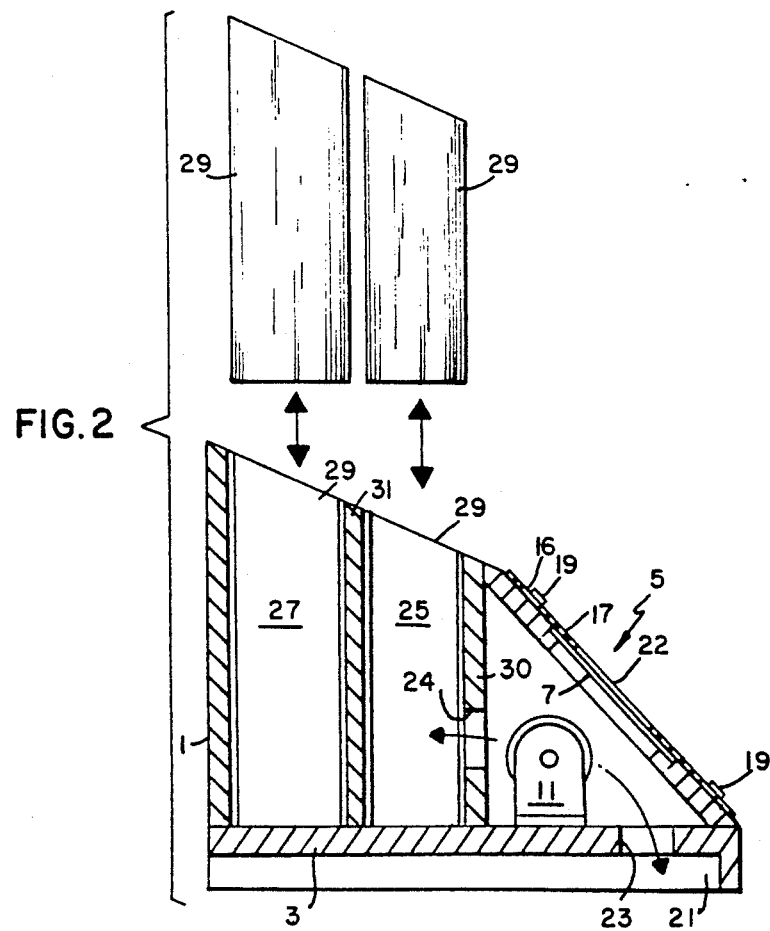
FIG. 2 is a cross sectional side elevational view taken along the line 1—1 of FIG. 1 of an embodiment of the lightbox of the present invention.

Referring now to FIG. 2. An array of masking cards 17A–E is shown disposed upon front wall 5. The masking cards 17A–E have identically positioned registration holes 16 disposed on their borders. Registration holes 16 are adapted to fit onto posts 19 so as to provide registration for masking cards 17 whereby viewing aperture 22 can be properly positioned over transparent viewing surface 7.

In the embodiment shown, the masking cards 17A–E vary from each other by the size of viewing area formed by apertures 22A–E. These apertures enable the operator to crop the negatives by placing them over the individual openings in each of the masking cards to provide for the best cropped display of the photograph that was taken. The operator of the lightbox can quickly move a negative from, for example, viewing aperture 22A which is relatively small to viewing aperture 22E which is larger. The best artistic depiction of the negative can thus be obtained with the cropping. Moreover, the operator, using the masking card system, can rotate the photograph to compensate for shots which were taken at an off angle. When the operator has determined the best cropping for the negative it can be taped onto the masking card and then the masking card can be turned over and proper identification and photograph size can be written upon the masking card.

As shown, the viewing surface 7 is disposed within the front wall 5 of the lightbox. The front wall 5 forms a frame for the transparent viewing surface 7 to hold it in place. To reach the light source 11 for replacement of a lamp the transparent viewing surface 7 is lifted from the frame to provide access. The removability of the transparent viewing surface 7 also enables the operator to keep the surface clean from dirt and finger prints which might ultimately obscure it. Although a fluorescent lamp is shown as the light source 11 other light sources such as incandescent lamps individually disposed behind each of the masking cards 17 can be used.

It is apparent that modifications and changes can be made within the spirit and scope of the present invention but it is my intention, however, to be limited only by the scope of the appended claims.

As my invention I claim:

1. A lightbox for cropping photographic negatives and having a plurality of sets of masking cards adapted to be disposed thereon, each set having differently sized apertures for viewing the negatives, said masking cards having marginal registration holes disposed at predetermined spatial locations relative to said apertures, said lightbox comprising:

a pair of side walls spaced from each other and a back wall and a bottom wall disposed between said side walls;

a front wall comprising a light transmitting viewing surface, said front wall sloping inwardly relative to said bottom wall;

a plurality of sets of posts disposed on said front wall, the posts of each set being vertically spaced from each other by a predetermined distance and each set being spaced horizontally from an adjacent set by a predetermined distance sufficient so each set of said posts can receive and support on said front wall a horizontally arranged array of said masking cards by said marginal registration holes, said posts being arranged to extend through said registration holes whereby to enable an operator to place the registration holes of different sets of masking cards on different sets of posts with the apertures of each set of cards being disposed over said viewing surface to quickly view a negative within the apertures and crop it for printing;

means to illuminate said light transmitting viewing surface and shine through the apertures in the masking cards.

2. The lightbox according to claim 1, wherein the inward slope of said front wall is approximately 45°.

3. The lightbox according to claim 1 wherein each of the posts are of a sufficient height to hold a plurality of masking cards.

4. The lightbox according to claim 1 wherein the light transmitting portion of said front wall is formed of a light transmitting plastic material.

5. The lightbox according to claim 1 further including a stand disposed beneath said bottom wall and at least one aperture in said bottom wall whereby to provide ventilation for said light source.

6. The lightbox according to claim 1 wherein there are at least five sets of posts disposed on said front wall and at least five sets of compartments disposed between said front wall and said back wall whereby to receive an assortment of masking cards having standardized shapes.

7. The lightbox according to claim 1 further including at least one row of compartments disposed between said front wall and said back wall, each of said compartments in a row being disposed rearwardly of each of the sets of posts.

8. The lightbox according to claim 7 wherein two rows of compartments are disposed behind each of said sets of posts.

9. The lightbox according to claim 7 wherein said bottom wall, said compartments and said front wall cooperate to form a housing for said light source.

10. The lightbox according to claim 7 wherein removable walls cooperate to form said compartments.

11. A lightbox for cropping photographic negatives and having a plurality of sets of masking cards adapted to be disposed thereon, the cards having differently sized apertures for cropping the negatives, all cards having marginal registration holes disposed at predetermined spatial locations relative to said apertures, said lightbox comprising:

a pair of side walls spaced from each other and a back wall and a bottom wall disposed between said side walls;

a front wall comprising a light transparent viewing surface, said front wall sloping inwardly relative to said bottom wall at an angle of approximately 45°;

a plurality of sets of posts disposed on said front wall, the posts of each set being vertically spaced from each other by a predetermined distance and each set being spaced horizontally from an adjacent set by a predetermined distance sufficient so each set of said posts can receive and support on said front wall a horizontally arranged array of said masking cards by said marginal registration holes, said posts being arranged to extend through said registration holes whereby to enable an operator to place the registration holes of different masking cards on different sets of posts with the apertures of each set of cards being disposed over said viewing surface to quickly view a negative against the apertures and crop it for printing;

at least one row of compartments disposed between said front wall and said back wall, each of said compartments in a row being disposed rearwardly of each of the sets of posts, said compartments and said front wall cooperating to form a housing for said light source;

means to illuminate said light transmitting viewing surface.

12. The lightbox according to claim 11 wherein two rows of compartments are disposed rearwardly of each of said sets of posts.

13. The lightbox according to claim 11 wherein each of the posts are of sufficient height to hold a plurality of masking cards.

14. The lightbox according to claim 11 wherein the light transmitting portion of said front wall is formed of a light transmitting plastic material.

15. The lightbox according to claim 11 further including a stand disposed beneath said bottom wall and at least one aperture in said bottom wall whereby to provide ventilation for said light source.

* * * * *